G. E. WOOD.
SEED CLEANER.
APPLICATION FILED SEPT. 18, 1916.
1,223,014.
Patented Apr. 17, 1917.
2 SHEETS—SHEET 1.
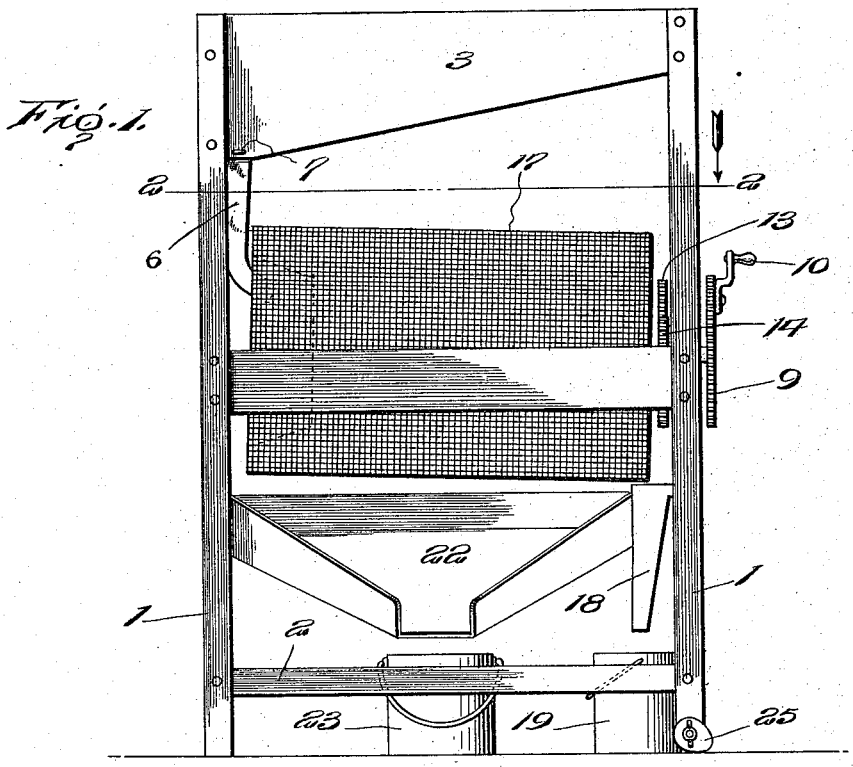
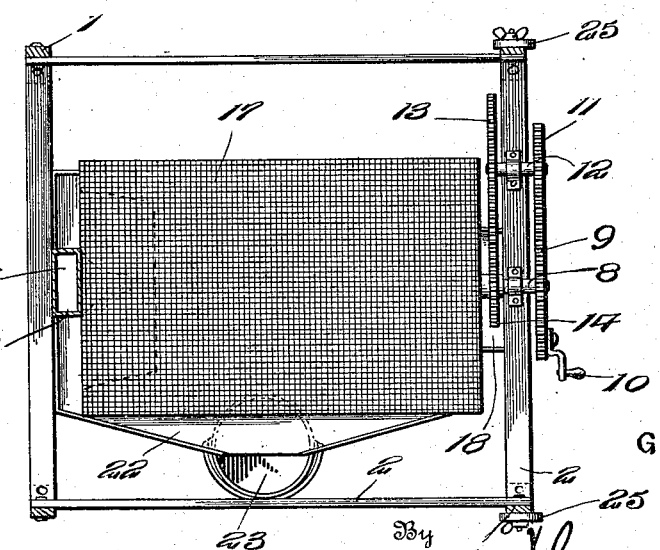
Inventor
G. E. Wood.

G. E. WOOD.
SEED CLEANER.
APPLICATION FILED SEPT. 18, 1916.

1,223,014.

Patented Apr. 17, 1917.
2 SHEETS—SHEET 2.

Inventor
G. E. Wood.

By
Attorneys.

UNITED STATES PATENT OFFICE.

GEORGE E. WOOD, OF ALBANY, OHIO.

SEED-CLEANER.

1,223,014.  Specification of Letters Patent.  Patented Apr. 17, 1917.

Application filed September 18, 1916. Serial No. 120,735.

*To all whom it may concern:*

Be it known that I, GEORGE E. WOOD, a citizen of the United States, residing at Albany, in the county of Athens and State of Ohio, have invented certain new and useful Improvements in Seed-Cleaners, of which the following is a specification.

This invention relates to seed cleaners and has for its object the provision of a simple and efficient mechanism whereby small seeds of undesirable size may be separated from marketable seeds.

A further object of the invention is to provide an apparatus for the stated purpose which may be easily operated and in which the parts will be compactly arranged and by the use of which chaff will be blown directly from the seeds and stones or other large objects which may accidentally find lodgment in the body of seeds will be eliminated.

Other incidental objects will appear as the description of the invention proceeds.

The invention is illustrated in the accompanying drawings and consists in certain novel features which will be particularly pointed out in the claim following the detail description.

In the drawings:

Figure 1 is a side elevation of a machine embodying my present improvements;

Fig. 2 is a horizontal section on the line 2—2 of Fig. 1;

Figure 3:
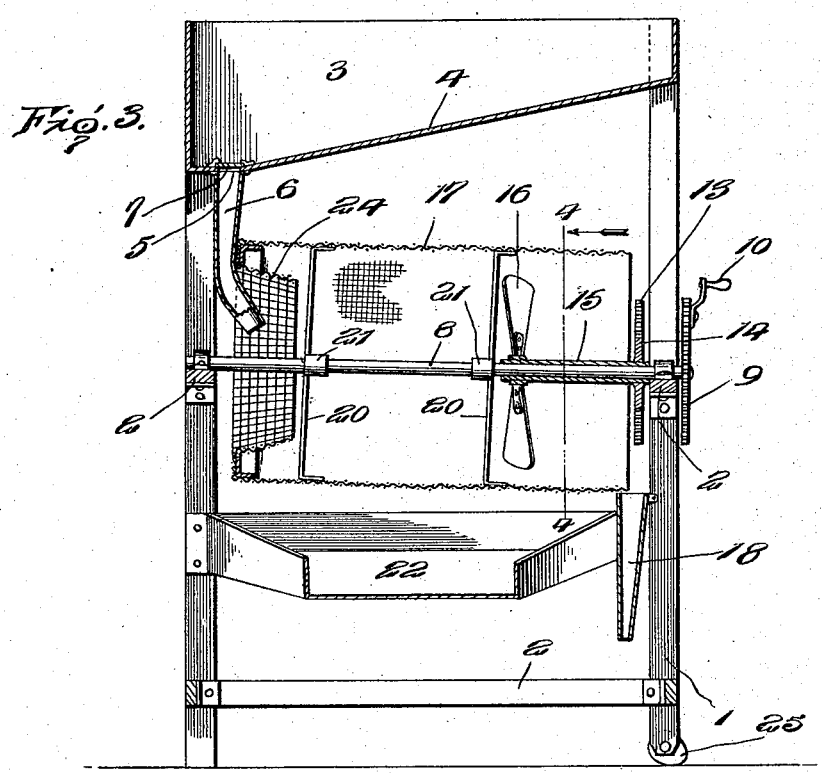
Fig. 3 is a longitudinal vertical section.

In carrying out my invention, I employ a supporting frame which may be of any convenient form and is illustrated as consisting of uprights 1 connected by beams 2. Supported by the upper end of this frame, is a hopper 3 in which the seeds to be treated are deposited and this hopper has an inclined bottom 4 extending downwardly toward one end of the supporting frame, as clearly shown, the said bottom 4 being provided at its lowest point with an opening 5 coinciding with the upper end of an outlet spout 6. A slidable cut-off 7 is mounted within the hopper and is adapted to extend over so as to completely cover the opening therein and thereby control the flow through the spout 6, as will be readily understood. Below the hopper, upon cross beams 2, I journal a driving shaft 8 which is equipped at the end remote from the spout 6 with a driving gear 9 provided with a handle 10, although it is to be understood that a band pulley may be substituted for this driving gear and the device operatively connected with some source of power without involving any departure from the invention. In the construction illustrated in the drawings, the driving gear 9 meshes with a pinion 11 which is fixed upon the outer end of a short countershaft 12 journaled upon the beam 2 and on the inner end of this countershaft is a gear wheel 13 meshing with a pinion 14 at the outer end of a hollow shaft 15 fitting around the driving shaft 8. On the inner end of the hollow shaft is secured a fan 16 which will drive a blast of air away from the driving gear and toward the inlet end of the cylinder 17 which is carried by the driving shaft and incloses the fan, as clearly shown in Fig. 3. The hollow shaft 15 is loose upon the driving shaft, of course, and it will be readily seen that by the described arrangement the driving shaft and the fan rotate in the same direction but the fan rotates at a higher speed.

The cylinder 17 is preferably constructed of wire netting or other foraminous material, the mesh being of such size as to permit the small undesirable seeds to pass through but prevent the passage of the good seeds which will be, consequently, caused to travel toward the outlet end of the cylinder and will pass through said end and drop onto a chute 18 by which they may be directed into any suitable receptacle, such as a pail 19. The cylinder and the driving shaft will be slightly inclined so that the passage of the seeds toward the discharge end thereof will be facilitated. The cylinder is carried by spiders 20 having their outer ends secured to the cylinder and their inner ends constructed with sleeves or hubs 21 which are secured to the driving shaft so that they will rotate with the same. A hopper 22 is secured upon the supporting frame below the cylinder so as to catch the seed dropping therethrough and this hopper is suitably formed to direct said seeds into a receptacle 23. At the inlet end of the cylinder is a conical screen 24 which is disposed concentric with the main cylinder 17 and is secured in the end of the same. This conical screen has its wider end at the inlet extremity of the main cylinder and is constructed with a larger mesh than the main screen so that all the seeds may pass through the same but rocks and large substances or tools which frequently are lost in the seed during the threshing operation will be arrested and thrown out through the inlet end of the cylinder.

At the lower ends of the legs the discharge side of the machine, I provide cams or adjustable supports 25 by the use of which the frame may be tilted more or less and the inclination of the cylinder varied to meet particular conditions.

Figure 4:
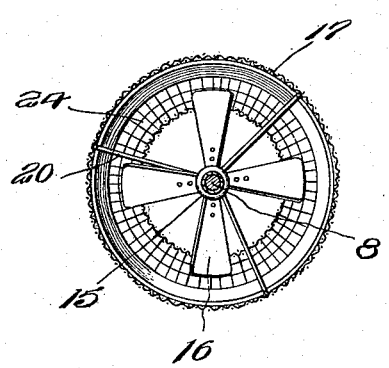
Fig. 4 is a detail section on the line 4—4 of Fig. 3.

It is thought the operation will be readily understood from the foregoing description, taken in connection with the accompanying drawings. The seed to be cleaned and graded is deposited in bulk in the hopper 3 and gravitates to the escape opening 5 whence it passes to and through the spout 6. The lower end of this spout is disposed between the ends of the conical screen 24 so that the seed and other matter will be caught by the inner surface of the said conical screen and an initial separation effected, the stones and other large substances being at once thrown from the device through the inlet end of the same. The separating cylinder and the fan will be rotated rapidly and a blast of air will be thereby created and directed toward and through the inlet end of the cylinder and against the inclined walls of the conical screen. This blast of air will separate the chaff and like particles of dirt from the seeds and will blow the same away from the device. The seeds will drop upon the inner surface of the separating cylinder 17 and the rotation of said cylinder will thoroughly agitate the seeds so that the smaller undesirable seeds will pass through the cylinder, while the larger valuable seeds will work toward the outlet end of the same and be directed through the chute 18 into the proper receptacle, as heretofore stated. It will be noted that the fan drives the air away from the operating gearing so that dirt cannot accumulate upon the gearing and clog the operation of the same. The spiders, by which the main separating cylinder is connected with the driving shaft, are very light and may be wire rods, as shown in Fig. 4, so that they offer no obstruction to the air blast created by the fan and as the fan is disposed within the cylinder it will act upon the inflowing seed and chaff in a highly efficient manner.

Having thus described the invention, what is claimed as new is:

An apparatus for the purpose set forth comprising a foraminous separating cylinder, a conical screen disposed within the cylinder at the inlet end of the same, means for feeding material onto the conical screen, a fan arranged within the cylinder to direct a blast of air through the inlet end of the cylinder and against the inclined walls of the conical screen, and means for rotating the cylinder and the fan.

In testimony whereof I affix my signature.

GEORGE E. WOOD. [L. S.]

Copies of this patent may be obtained for five cents each, by addressing the "Commissioner of Patents, Washington, D. C."